United States Patent [19]

Paterson et al.

[11] 4,002,559
[45] Jan. 11, 1977

[54] SCREW CONVEYOR WITH DEWATERING MEANS

[75] Inventors: Malcolm M. Paterson, Atkinson, N.H.; Michael J. Theodore, Weston, Mass.

[73] Assignee: Raytheon Company, Lexington, Mass.

[22] Filed: Aug. 25, 1975

[21] Appl. No.: 607,414

[52] U.S. Cl. .................................. 209/3; 210/415; 209/152

[51] Int. Cl.² ........................................... B03B 1/00

[58] Field of Search .... 209/3, 11, 34, 35, 133–137, 209/147, 152, 393, 300, 306, 273; 210/403, 413, 415, 499; 100/90, 93 S, 127–129, 117; 34/69, 60, 14; 198/64, 213

[56] References Cited

UNITED STATES PATENTS

| | | | |
|---|---|---|---|
| 1,981,318 | 11/1934 | James | 209/152 X |
| 2,288,883 | 7/1942 | Bixby | 209/393 |
| 2,983,379 | 5/1961 | Cram | 209/273 |
| 3,055,291 | 9/1962 | Ginaven | 100/129 X |
| 3,230,865 | 1/1966 | Hibbel et al. | 100/93 S X |
| 3,695,173 | 10/1972 | Cox | 100/117 X |
| 3,720,380 | 3/1973 | Marsh | 241/20 |
| 3,804,249 | 4/1974 | Gibbons et al. | 209/473 |
| 3,897,215 | 7/1975 | Davidson et al. | 209/3 X |

FOREIGN PATENTS OR APPLICATIONS 212,947   8/1968   U.S.S.R. ............................ 100/127

*Primary Examiner*—Frank W. Lutter
*Assistant Examiner*—Ralph J. Hill
*Attorney, Agent, or Firm*—Harold A. Murphy; Joseph D. Pannone; John T. Meaney

[57] ABSTRACT

A screw conveyor for moving water-laden materials from one location to another comprising a feeder screw extending longitudinally within an enclosing duct or housing and a dewatering cylinder closely encircling the screw and comprised of closely spaced elements of substantially triangular or teardrop cross-sectional shape to remove water from the material as it is moved progressively along the duct by the flights of the screw.

15 Claims, 9 Drawing Figures

SCREW CONVEYOR WITH DEWATERING MEANS

BACKGROUND OF THE INVENTION

Screw conveyors are commonly used as a means for removing materials from a bin or hopper and usually employ a shroud or casing extending from the intake opening of the hopper and enclosing the feeder screw to assure consistent flow control.

In resource recovery systems, for example, a screw conveyor is utilized to remove shredded materials from a supply hopper to the interior of a rotary air drum classifier which separates the mixed materials into light and heavy materials. Such a system is disclosed in U.S. Patent application Ser. No. 580,373, filed May 22, 1975, by the assignee of the present invention. In such a system a cylindrical casing or housing is fixed at one end to the hopper and its other end projects into the interior of a hollow drum which is mounted with its longitudinal axis disposed at an angle to the horizontal and which is made to rotate about its axis to cause heavy materials falling from the conveyor to move progressively downwardly within the drum and to eventually fall out of the lower end thereof, while light materials become entrained in a high velocity flow of air which carries the light materials out of the upper end of the drum.

It is well known that the materials being transported by the screw conveyor often contain substantial amounts of water. This is especially true in commercial waste recovery systems which process materials including amounts of garbage which have a relatively high water content. Consequently as the wet materials are forced by the screw through the duct they tend to be compressed or compacted to such an extent that they will eventually emerge from the exit end of the conveyor as relatively large agglomerations or lumps wherein various parts or materials adhere together by the action of the water. In a materials separation system, such as a drum classifier, it sometimes happens that these agglomerations, unless broken up, will be removed with the heavy materials although the constituents of the agglomerations would otherwise be removed with the light materials.

Apparatus of this character will work well when completely dry materials are used. Therefore, attempts to heat and consequently dry such wet materials while simultaneously aerating them have been attempted. One such attempt is disclosed in U.S. application Ser. No. 580,374, filed May 22, 1975. However, it is not always convenient to supply heat to the apparatus.

SUMMARY OF THE INVENTION

The foregoing and other disadvantages of the prior art are overcome by the present invention wherein a screw conveyor is provided with means for removing water from materials being transported. Such means comprises a dewatering cylinder which closely encircles the feeder screw of the conveyor within the housing or casing, which cylinder comprises an array of closely spaced elements such as rings, turns or rods which are spaced apart from one another a distance sufficient only for water to pass therebetween and which are each provided with a triangular or teardrop cross-sectional configuration which effectively creates a venturi between each adjacent pair of elements such as will assist in drawing water from the materials inside the cylinder through the spaces between elements.

Thus, in a waste materials recovery system, for example, the flutes of the feeder screw will engage materials being transported with considerable pressure as it forces the materials from a hopper to a drum classifier. Such pressures on the materials will cause a considerable amount of water within the materials to be squeezed toward the outside surfaces of the mass as it moves progressively along the enclosing casing. Although in conventional screw conveyors such collections of water can be removed only with difficulty, and will often be deposited in the drum, in accordance with this invention this water will be extruded through the dewatering cylinder into the casing where it will be allowed to flow off and be collected without passing into the drum. Thus, materials emerging from the exit end of the conveyor will be considerably drier than those in the feed hopper at the entrance of the conveyor.

BRIEF DESCRIPTION OF THE DRAWINGS

The above and other advantages of this invention will become apparent from the following description taken in connection with the accompanying drawings, wherein.

DESCRIPTION OF THE PREFERRED EMBODIMENTS

Figure 1:
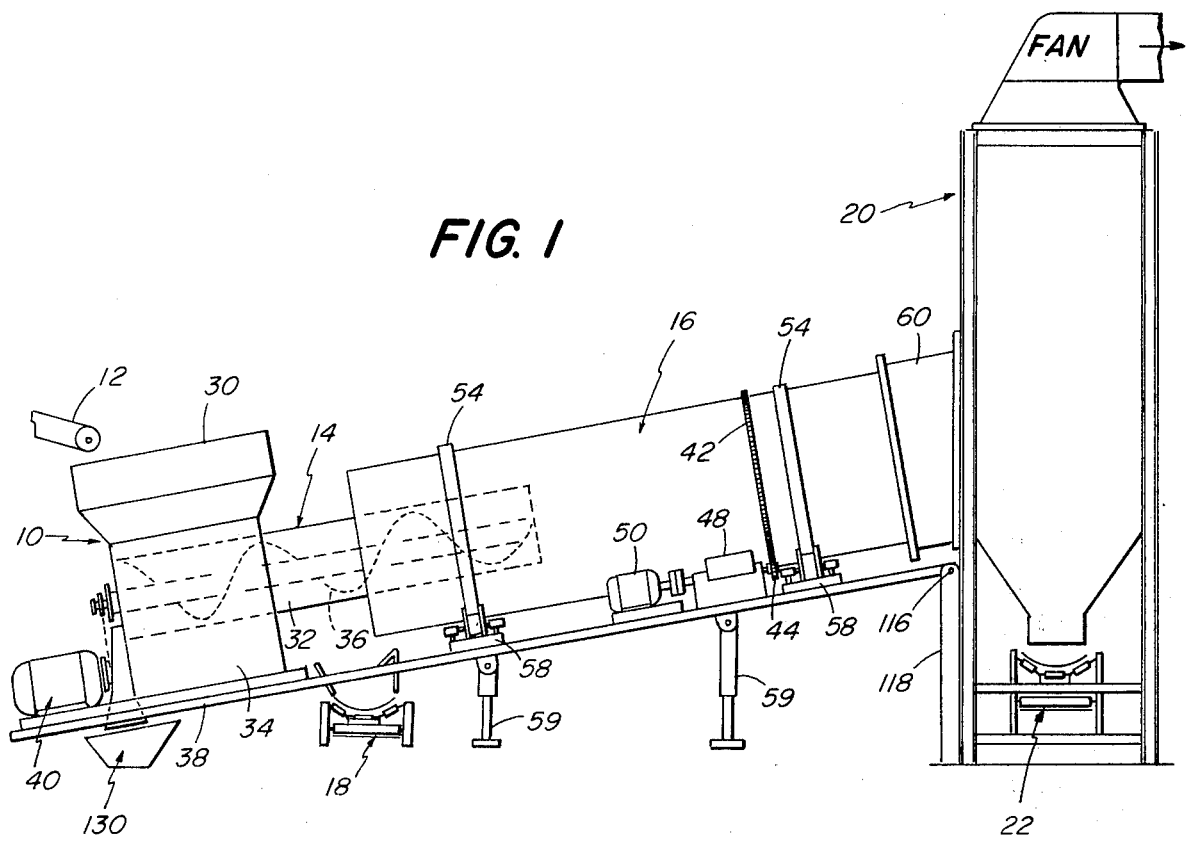
FIG. 1 is a schematic elevational view of a portion of a waste materials classifying system employing a screw conveyor embodying the invention.

Referring more particularly to the drawings wherein like characters of reference designate like parts throughout the several views, a screw conveyor embodying the invention is shown in FIG. 1 incorporated in a materials separating apparatus. It is to be understood, however, that the invention may be conveniently employed in screw conveyors having utility in many other apparatus and systems. Therefore, this description should not limit the applications in which the invention may find practical use.

The apparatus shown in FIG. 1 includes a number of cooperating devices arranged to process and separate materials automatically in sequential fashion. A feed hopper 10 receives shredded raw material from an adjacent conveyor 12 and directs it to a screw conveyor 14 which deposits it within a rotatable air drum classifier 16. The drum classifier separates the raw materials into light and heavy materials in the known fashion of devices of this character. The drum is angled at a selected inclination, such as 10° for example, and air is caused to flow through it at high velocity. As raw materials drop from the end of the feed screw onto the bottom of the drum wall, the heavy materials will be rotated upwardly with the drum to a point where they will fall to a lower point within the drum. This action is repeated until eventually the heavy materials fall out of the lower end of the drum onto a conveyor 18 which will carry them away for further processing or disposal.

The light materials will be entrained within the high velocity air stream and will be carried out the upper end of the drum 16 into a plenum chamber 20. In the plenum chamber 20 these light materials are further separated into light and medium fractions by controlling the velocity of the air stream within the chamber 20. The air stream from the drum 16 enters the plenum chamber 20 at a point in the lower regions thereof and exits at the top. Thus, by controlling the size of the chamber, and thus the velocity of the air rising within it, the heavier of the materials entrained within the air stream may be permitted to fall by gravity to the bottom of the chamber for removal by suitable means such as a conveyor 22 for eventual reprocessing or disposal such as by incineration or other means.

The lighter fractions will continue to be entrained within the air stream and will be carried into one or more cyclone collectors (not shown) or the like. Such light fractions may serve many purposes and have been found particularly suitable for use as fuel. They are removed from the cyclones by suitable conveyors which will then carry them to selected supply or disposal areas.

The feed hopper 10 is provided with a bucket portion 30 at its upper end into which the raw materials are deposited by the conveyor 12. These raw materials have previously been shredded so that they comprise a mixture of raw material elements not exceeding about 12 inches in size, for example.

A feed duct or casing 32 extends from the base 34 of the feed hopper 10 into the adjacent end of the drum 16. Within the casing 32 is a feed screw 36, one end of which is mounted in the hopper base 34 to receive the raw materials from bucket 30. Hopper 10 is mounted upon a suitable base or platform 38 which also supports the drum 16, as will be described.

Screw 36 is driven by a motor and chain drive 40 so that the raw materials will be moved along casing 32 into the drum interior. The casing is preferably closed at its end within the drum, and is apertured at the bottom adjacent the end wall so that the raw materials will fall through the aperture onto the drum wall preferably at a point within the first third of the length of the drum.

At a point midway of its length the drum is provided with a fixed circumferential sprocket wheel 42 which meshes with a chain link drive belt 44 rotatably connected to one end of a reduction gear box 48 which is interconnected with drive motor 50 on platform 38 whereby rotation of the drum is accomplished.

The platform 38 and consequently the drum 16 thereon is angled to a selected inclination, such as 10° for example. To prevent longitudinal displacement of the drum there are provided two fixed restraining rings or collars 54 extending around the circumference of the drum and spaced from respective ends thereof. Each ring 54 engages suitable roller bearing supports 58 carried by the platform 38 and are prevented from axial misalignment to preclude longitudinal movement of the drum as it is rotated.

As shown in FIG. 1, the angle of inclination of the drum 16 may be altered to vary the velocity of the air flowing through the drum and to thereby vary the ratio of lights to heavies being separated within the drum. Such changing of the angle of inclination of the drum may be accomplished by means of jackposts 59, for example, which are suitably mounted beneath the drum 16 and attached to it as by devices 61.

The upper end of the drum extends into a suitable sealing ring 60 which is fixed over an inlet opening in the adjacent side wall of the plenum chamber 20.

It is important, however, to retain the upper end of the drum constantly within the sealing ring 60 in the plenum chamber 20. Therefore, the upper end of the drum is pivoted as by a suitable bearing and shaft arrangement 116 carried preferably by the adjacent end of the platform 38 and rotatably mounted at the upper ends of fixed supports or standards 118. Thus, the platform 38 can be raised and lowered by manipulation of the jackposts 59, causing the drum to be angled about the axis of the pivotal connection 116.

Air at high velocity is forced through the drum 16 by means of fans or blowers as may be seen at the top of plenum chamber 20 in FIG. 1, for example, which are mounted in any suitable fixed location and operatively connected to the cyclone and consequently to the plenum chamber 20. Thus, air is also drawn upwardly out of the plenum chamber 20, and simultaneously into the plenum chamber from the rotary drum 16.

In accordance with the present invention the screw conveyor 14 is provided with dewatering means to remove water from the materials being forced through the casing 32 into the drum 16. It will be apparent that the flights of the rotating feed screw 36 will exert considerable pressure upon the materials as they progress through the casing. Accordingly some water will be forced toward the outer surfaces of the mass being transported. A small amount of this water may escape from the lower end of the casing, but the greater part of it will be propelled along with the mass into the drum because of the fact that the flights of the feed screw are disposed close to or in engagement with the inner wall of the casing 32.

In order to remove this water, the present invention includes the provision of a dewatering cylinder or tube 120 (FIG. 2) which is disposed within the casing 32 coaxially therewith and in spaced relation to the inner wall of the casing. The outer edges of the flights of the feed screw 36 will be disposed close to or in engagement with the inner circumferential surface of the cylinder 120. Thus, material being moved by the feed screw 36 will be forced through the interior of the dewatering cylinder 120.

Figure 3:
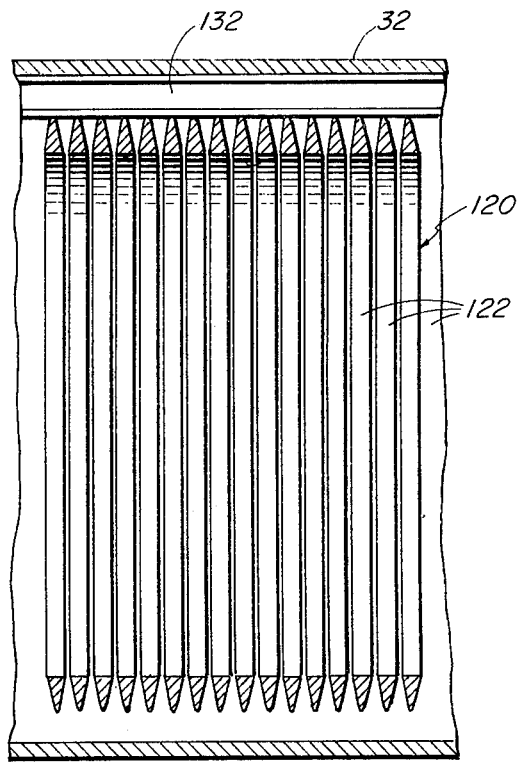
FIG. 3 is an enlarged fragmentary sectional view showing a dewatering cylinder with parallel rings.

As shown in FIG. 3, the dewatering cylinder 120 comprises a number of rings 122 which are disposed closely adjacent one another, each being perpendicular to the axis of the cylinder 120. In cross-section each ring is substantially triangular or teardrop in shape as shown best in FIG. 7, with the base 124 of the triangle disposed inwardly. Thus the bases of the triangles of the rings 122 are aligned to form the inner circumferential surface of the cylinder 120, which surface is broken at systematic intervals by the spaces 126 between rings. The spaces 126 are preferably of a size only sufficient to permit water to pass through. For example, in a cylinder comprised of rings 124 having an outer diameter of about four feet, and a base 124 thickness of about 1 ¼ inches, the spacing 126 may be about 0.025 inch.

Such dimensioning of the spacing 126 may be varied considerably, however.

Figure 7:
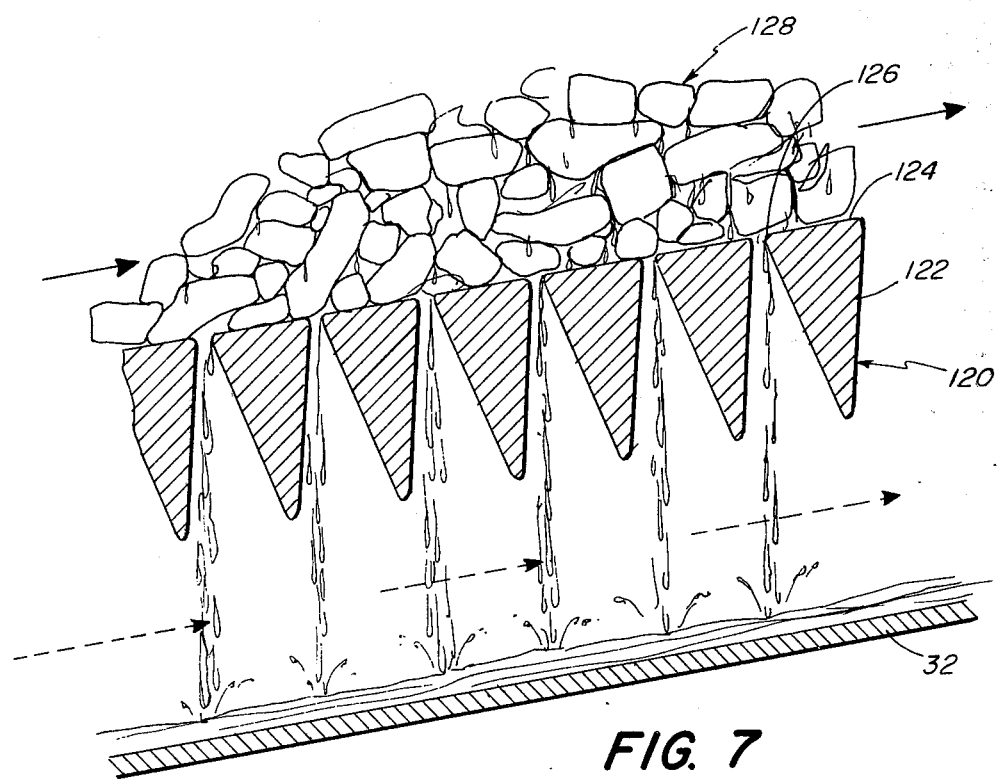
FIG. 7 is an enlarged diagrammatic illustration of the venturi effect created by the invention and taken substantially in the area 7—7 of FIG. 2.

As illustrated in FIG. 7, as material 128 is urged along the cylinder 120 it will be moved over the inner surfaces 126 of the rings 122 and consequently across the spaces 126. The water in the material 128 thus will be forced out of the cylinder 120 through the spaces 126 and will be collected in the bottom of the casing 32 from which it will flow out of the lower end into a suitable water collector 130 (FIG. 1) of any sort.

As mentioned above, in the operation of a materials separating apparatus as shown in FIG. 1 air is forced at high velocity through the drum 16. This air flow can easily be made to flow also through the screw conveyor casing 32 as indicated by dotted arrows in FIG. 7. When this occurs, the spaces between rings effectively become venturis which assist in drawing water from the interior of the cylinder 120, thus increasing the efficiency of the dewatering system.

Figure 2:
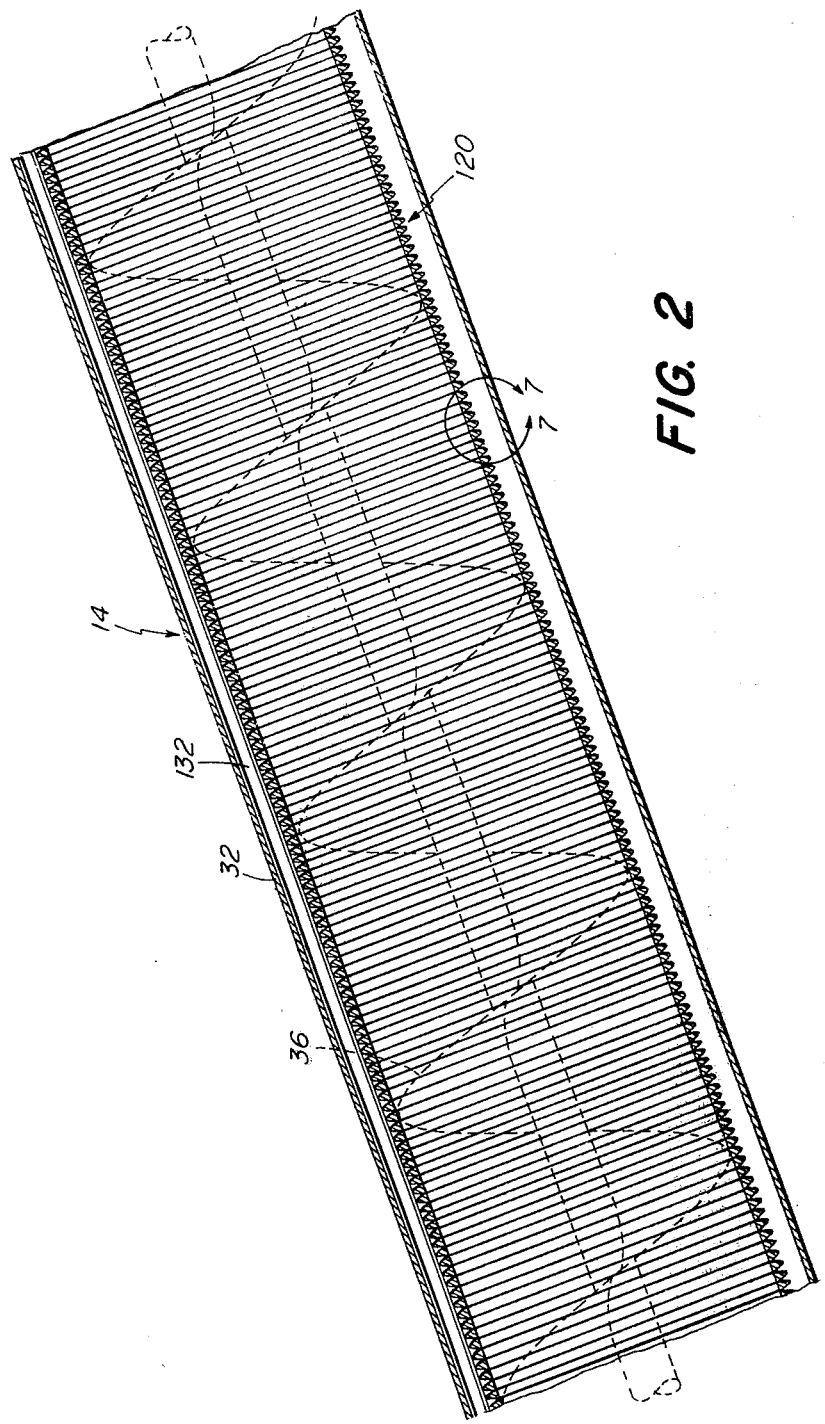
FIG. 2 is an axial sectional view of a screw conveyor embodying one form of the invention.

The array of rings 122 defining the dewatering cylinder 120 in FIGS. 2 and 3 may be supported in any suitable manner within the casing 32. For example, I-beams 132 may be welded or otherwise secured to the rings 122 and to the casing 32 as shown in FIGS. 2 and 3.

Figure 4:
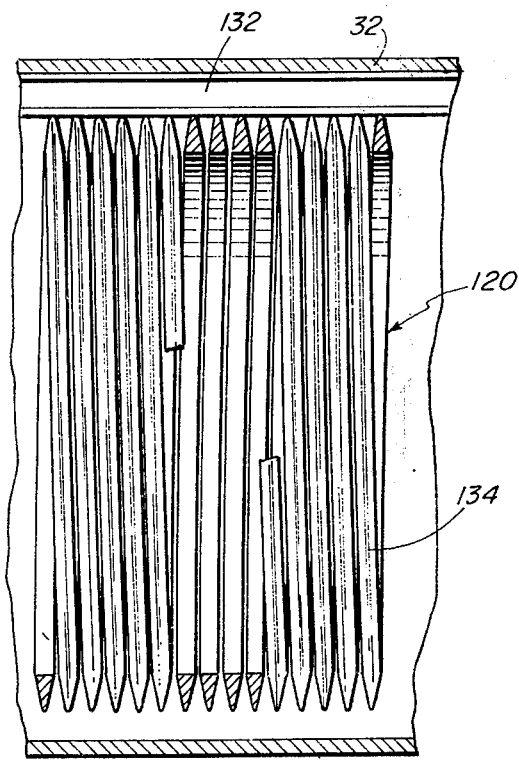
FIG. 4 is a view similar to FIG. 3 showing a dewatering cylinder formed as a coil.

It will be apparent that the dewatering cylinder 120 may be of other desired configurations. For example, instead of forming the cylinder 120 of an array of spaced rings 122 as shown in FIG. 3, the cylinder 120 may be a coil 134 as shown in FIG. 4, the continuous winding which comprises the turns of the coil being of substantially triangular cross-sectional shape so as to perform the desired dewatering function when material is forced lengthwise through the interior of the coil 134 by an axially disposed feed screw.

Figure 5:
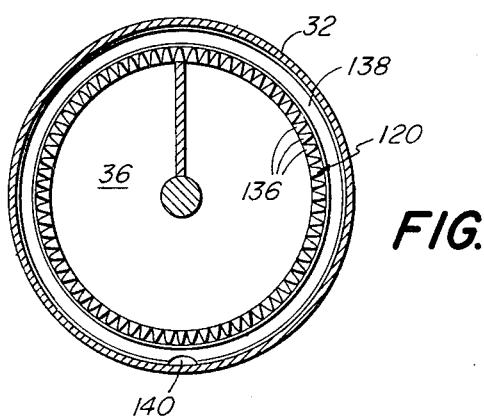
FIG. 5 is an enlarged transverse sectional view showing a dewatering cylinder with longitudinal rods.

The dewatering cylinder 120 in a still different configuration may comprise spaced, longitudinally extending parallel rods 136, as shown in FIG. 5. The rods 136 are supported in the casing 32 by encircling rings 138, with the feed screw 36 extending coaxially within the cylinder 120. The supporting rings 138 may be provided with notches 140 at their lowest extremities so that water will be permitted to flow along the bottom of the casing 32.

Figure 6:
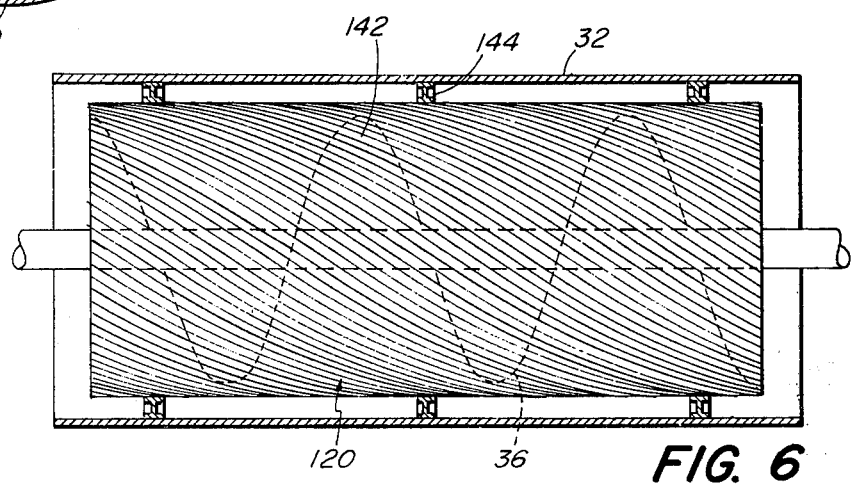
FIG. 6 is an elevational view partly in section of a screw conveyor with a dewatering cylinder with a sprial rod arrangement.

In a still further configuration, the dewatering cylinder 120 may comprise, as shown in FIG. 6, an array of rods 142 extending parallel with one another in a spiral fashion axially within the casing 32. The feed screw 36 extends axially within the cylinder of spiral rods 142, and rings 144 around the cylinder secure it to the casing 32. The spirals formed by the rods 142 are preferably curved in a direction opposite to the curve of the spiral defined by the flights of the feed screw 36 so that material within the cylinder will be directed properly across the spaces between the rods so that water may be removed.

Figures 8, 9:
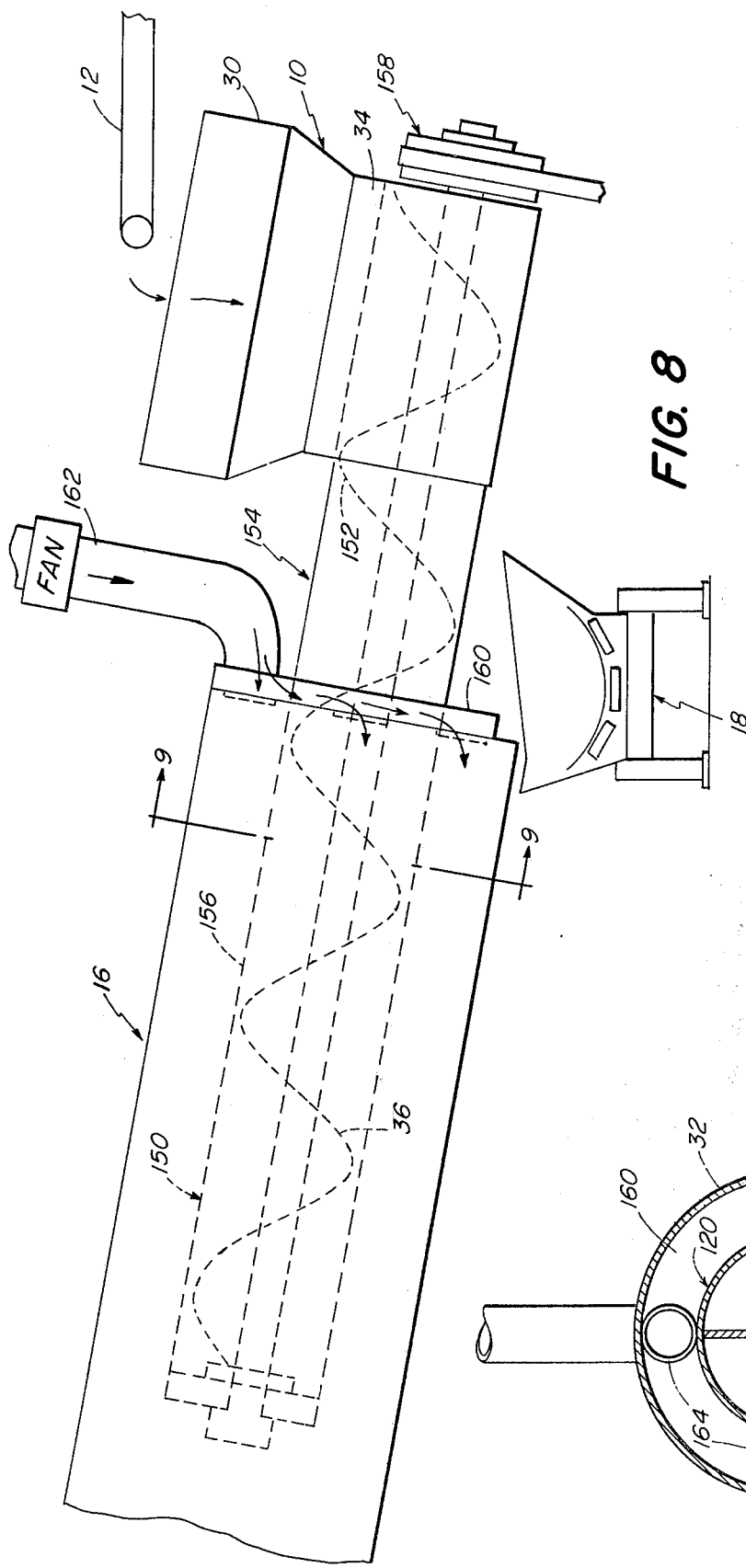
FIG. 8 is an elevational view of a modified air drum classifier utilizing the invention.
FIG. 9 is a sectional view taken on line 9—9 of FIG. 8 looking in the direction of the arrows.

In FIGS. 8 and 9 there is shown an embodiment of the invention wherein a rotary drum 16 is fed by a screw conveyor 150 which comprises a feed screw 152 located within a casing 154 which is a substantially imperforate solid material extending between the drum 16 and the hopper 10. However, within the drum 16 the solid casing is replaced by a dewatering cylinder 156 extending coaxially of the drum around the feed screw 36. Action of the feed screw 36 upon material passing through the cylinder 156 from the hopper 10, as the screw is rotated by drive means 158, will cause water to be squeezed out of the material, which water will pass through the cylinder through the spaces between the elements of which the cylinder is formed. This extruded water will be gathered in the bottom of the drum 16 and will flow out of the lower end of the drum, either mixing with the heavy materials being removed by conveyor 18, or separted by any suitable means, as desired.

The venturi effect, described hereinbefore, to achieve greater efficiency in water removal from the material is obtained by forcing air at high velocity through the drum, either by the suction process described or by other means such as the use of a manifold 160 at the lower end of the drum. The manifold 160 is preferably of inverted U-shaped configuration to fit over the lower end of the drum in encircling relation to conveyor casing 154. An inlet duct 162 connects the manifold 160 with a blower as may be seen in FIG. 8, for example, which directs a high velocity flow of air through the duct 162 and manifold 160, out through ports 164 into the drum. This air flow passes over the outer surface of the dewatering cylinder 156 and causes water to be extracted or extruded from the material, as described.

It will be apparent that all of the objectives of this invention have been achieved by the screw conveyor with dewatering means shown and described. However, it will also be apparent that various changes and modifications in the structures shown and described may be made by those skilled in the art without departing from the spirit of the invention as expressed in the accompanying claims. Therefore, all matter shown and described is to be interpreted as illustrative and not in a limiting sense.

What is claimed is:

1. Material conveying apparatus comprising an elongated casing, a feed screw for moving material longitudinally within the casing, and dewatering means enclosing at least a portion of said screw for removing water from material being moved by said screw, said dewatering means comprising an apertured dewatering cylinder extending longitudinally within the casing and in close encircling relation to the feed screw, and means for directing a high velocity air flow within the casing and over the outer surface of the cylinder for creating a venturi effect at the apertures in the cylinder to assist in removal of water from the material through the apertures.

2. Apparatus as set forth in claim 1 wherein said cylinder is an array of elements disposed in slightly spaced parallel relation with one another coaxially around the screw.

3. Apparatus as set forth in claim 2 wherein said elements are rings encircling the screw.

4. Apparatus as set forth in claim 2 wherein said elements are turns of a coil encircling the screw.

5. Apparatus as set forth in claim 2 wherein said elements are rods extending axially of the screw in surrounding relation thereto.

6. Apparatus as set forth in claim 5 wherein said rods are disposed in spiral fashion around the screw.

7. Apparatus as set forth in claim 2 wherein each of said elements is substantially triangular in cross-sectional shape with the base of the triangle being disposed toward the axis of the screw.

8. Material handling apparatus comprising a hopper, material separating apparatus comprising a rotary drum air classifier for receiving materials from said hopper and separating them into light and heavy materials, screw conveyor means for moving said material from the hopper into the drum, said conveyor means comprising a feed screw, dewatering means enclosing at least a portion of said screw for removing water from material being moved by said screw, said dewatering means comprising an apertured dewatering cylinder extending longitudinally within the drum and in close encircling relation to the feed screw, and means for directing a high velocity air flow longitudinally within the drum and over the outer surface of said cylinder for entraining and removing light materials from the drum and for simultaneously creating a venturi effect at the apertures in the cylinder to assist in removal of water through said apertures from material being moved by the screw.

9. Material handling apparatus as set forth in claim 8 wherein said conveyor means further includes a casing within the drum and enclosing the cylinder in spaced relation to it, and said high velocity air stream is also directed through said casing.

10. Apparatus as set forth in claim 8 wherein said cylinder is an array of elements disposed in slightly spaced parallel relation with one another coaxially around the screw.

11. Apparatus as set forth in claim 10 wherein said elements are rings encircling the screw.

12. Apparatus as set forth in claim 10 wherein said elements are turns of a coil encircling the screw.

13. Apparatus as set forth in claim 10 wherein said elements are rods extending axially of the screw in surrounding relation thereto.

14. Apparatus as set forth in claim 13 wherein said rods are disposed in spiral fashion around the screw.

15. Apparatus as set forth in claim 10 wherein each of said elements is substantially triangular in cross-sectional shape with the base of the triangle being disposed toward the axis of the screw.

* * * * *